March 19, 1963    A. C. DICKEY    3,081,945
PORTABLE WATER FOUNTAIN
Filed Sept. 11, 1961

INVENTOR,
Alexander C. Dickey

United States Patent Office 3,081,945
Patented Mar. 19, 1963

3,081,945
PORTABLE WATER FOUNTAIN
Alexander C. Dickey, P.O. Box 2021, Jackson, Tenn.
Filed Sept. 11, 1961, Ser. No. 137,417
4 Claims. (Cl. 239—29)

This invention relates to certain new and useful improvements in water fountains, and particularly is intended to provide a portable fountain unit which may conveniently be connected to an external water connection so as to provide a convenient means for furnishing water particularly for small children who may be playing in the yard area about the house.

It is a matter of common knowledge that children playing in the yard, upon becoming thirsty, have a tendency to go to the nearest hydrant or faucet whether the same is located in the most valuable flower bed or otherwise in order to obtain a drink of water, and failing the access of such an external faucet will track into the kitchen or other areas of the house in order to obtain such a drink of water.

With this particular problem in mind, the present invention is intended to provide a convenient means of a portable water fountain which may be detachably connected with an external source of water, such as a hydrant or the like, and which may be positioned as desired in ready accessibility to the children or other persons who may desire a drink of water.

The principal object of the present invention is to provide a portable fountain shell, to the body of which is connected an inlet water pipe from which an upstanding standpipe having a discharge valve connected at its upper end is supported.

A further object of the invention is to provide such a fountain device, in which the fountain shell is filled with a filtration medium as of the nature of sand or gravel, or both, for the purpose of receiving overflow water unconsumed in the drinking use and to prevent the same from flowing over the top of the fountain.

A further object of the device is to provide such a fountain in which the shell is provided adjacent its lower end with a series of perforations for the gradual seepage discharge of such overflow water.

A further object of the invention is to provide such a device in which the perforations in the shell are disposed slightly above the level of the intake pipe connected with the body of the shell in order to provide in the lowermost portion of the shell a sump for the reception and retention of water, cooling by evaporation the piping entering into the shell; and A further object of the invention is generally to improve the design, construction and efficiency of fountain devices.

The means by which the foregoing and other objects of the present invention are accomplished and the manner of their accomplishment will be readily understood from the following specification upon reference to the accompanying drawings, in which.

Figure 1:
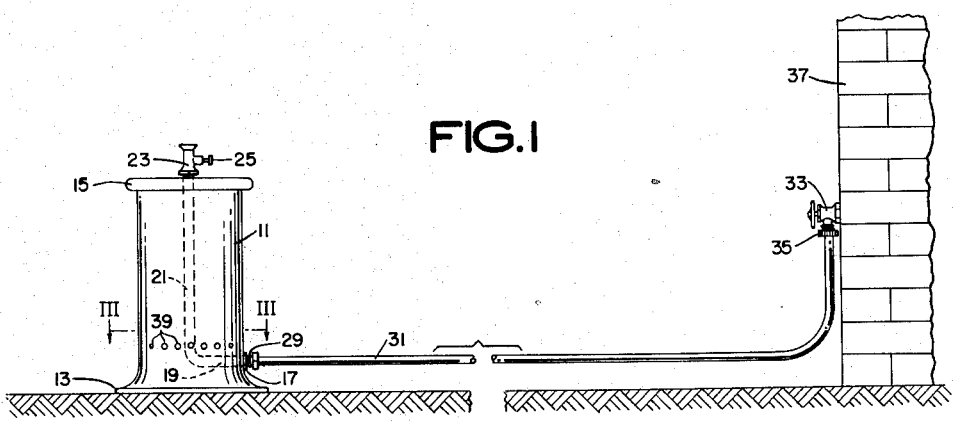
FIG. 1 is a side elevational view illustrating a fountain device of the present invention connected by a flexible hose or pipe to an external hydrant mounted upon the wall of a building, with parts of the pipe being broken away for purposes of illustration, and with the discharge pipe within the fountain being shown in dotted line.
Figure 2:
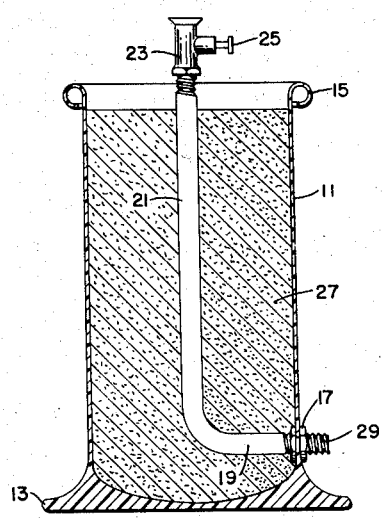
FIG. 2 is a vertical sectional view substantially along the central midline of the fountain device on an enlarged scale.
Figure 3:
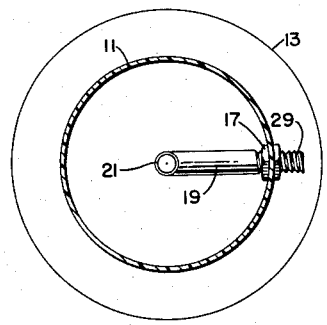
FIG. 3 is a sectional plan view on a scale similar to that of FIG. 2 taken as on the line III—III of FIG. 1.

Referring now to the drawings in which the various parts are indicated by numerals, the device of the present invention comprises a fountain shell 11 which is preferably formed of a suitable plastic material. Shell 11 is preferably substantially cylindrical in cross section of the body part thereof, is hollow, and is upwardly open.

To the lower end of shell 11, a pedestal portion 13 is rigidly fixed, preferably being integrated with the body of shell 11. Pedestal 13 flares outwardly from the bottom of shell 11 and provides a firm base upon which the shell may be mounted in use.

At its upper end shell 11 is provided with a rolled over rim 15, which not only finishes off the top of the shell, but also provides a convenient handle means for moving the shell from place to place as may be desired.

Adjacent the lower end of shell 11, and slightly above pedestal 13, an intake pipe is fixed as at 17 to the body of the shell. The intake pipe includes a lower substantially horizontal portion 19 which merges into and is rigidly connected with an upstanding standpipe portion 21. Standpipe 21 and intake portion 19 are preferably formed integrally together so that the fixing of intake portion 19 at joint 17 to body of shell 11 rigidly fixes the pipe to project into and upwardly through the body of the shell and to be retained in substantially upright condition.

At its upper end, and above the level of rim 15, standpipe section 21 is provided with a discharge valve 23 which is of substantially conventional construction and is of the type which is normally closed against discharge of fluid therefrom, but which may be opened as by depressing the push button 25, opening the valve to permit discharge therefrom.

Within the body of shell 11, standpipe 21 and intake portion 19 are surrounded by and embedded in a filler 27 which may consist of sand, gravel or other aggregate material, and which substantially fills the interior of the body of shell 11, snugly surrounding the standpipe 21 and assisting in retaining the standpipe in upright condition.

Externally of shell 11 and beyond joint 17, intake portion 19 is provided with a fitting 29 which is adapted to be threadedly engaged by a mating fitting on an elongated pipe or hose 31. The opposite end of the hose is adapted to be matingly fitted upon a suitable faucet 33, as at 35, faucet 33 being mounted upon the exterior of a building 37 and providing a suitable source of water under pressure for delivery into hose 31.

Adjacent the lower end of shell 11, and preferably slightly above the level of intake pipe 19, the shell is provided with a peripheral series of apertures 39 which extend through the body of the shell into the exterior thereof and communicate with the interior so as to enable the convenient slow discharge of the water which may accumulate in the shell 11.

It will be observed that below apertures 39 shell 11 is imperforate so that the lowermost portion of the shell between pedestal 13 and apertures 39 provides a sump for the collection and retention of water therein.

In the use of the device it will be observed that it may readily be connected up in the manner which has just been suggested and described. The fountain shell may be carried from place to place in the yard or other area surrounding the building 37 and positioned as desired, with the positioning thereof being shifted from time to time if the same becomes desirable.

With the fountain so positioned it is apparent that it will be conveniently available for persons, particularly small children, playing in the yard area adjacent to the building, to activate the discharge valve 23 and to obtain therefrom a discharge of water delivered from faucet 33 through hose 31, thence through intake pipe 19 and standpipe 21 to the discharge valve.

As there is usually waste water in such an operation such waste water falls downwardly within the shell, filtering down through the filler 27, and upon accumulation of a sufficient amount of such excess flow in the shell discharge is accomplished through the apertures 39.

It will further be observed that inasmuch as the sump created below the apertures and between them and the pedestal 13 retains a supply of such accumulated waste water, the intake pipe is constantly under a cooling influence in its position from its embedment in such sump, and also from the evaporation of the fluid contained therein, thus enhancing the cooling of the fluid which may be delivered into the fountain.

It is apparent that when it is desired to store the item, the hose connection may readily be disconnected, the filler 27 may be discharged from the body of the shell, and the shell simply and readily put away in a convenient storage place within the building, such as in the basement or attic.

I claim:

1. External fountain means comprising a movable hollow upstanding shell having an open upper end, a pedestal stably supporting said shell against tipping and integrally connected to the lower end thereof, a peripheral rim connected to the upper end of said shell providing handle means for movement of said shell, a horizontal intake pipe section rigidly connected to and extending outwardly through the body of said shell adjacent but above the lower end of said shell, a vertical standpipe connected with said intake pipe and extending upwardly through the interior of said shell into the open upper shell end and spaced from said rim, means connecting said intake pipe outwardly of said body with a source of water supply, a discharge valve communicating with said standpipe at its upper end adjacent the top of said shell and spaced from said rim, a filler of aggregate substantially completely filling said shell, said filler surrounding and supportingly engaging said standpipe to maintain said standpipe in substantially vertical position, said standpipe being supported vertically thereby and being otherwise without support throughout its length, a peripheral series of perforations formed in the body of said shell above the level of said intake pipe section, the lower portion of said shell below said series of perforations being imperforate and defining a sump for collection of overflow water to cool said intake pipe, said aggregate filler providing a filtration means along the length of said standpipe receiving said overflow water to cool said standpipe along its length.

2. External fountain means comprising a movable hollow upstanding shell having an open upper end, a pedestal stably supporting said shell against tipping and integrally connected to the lower end thereof, a horizontal intake pipe section rigidly connected to and extending outwardly through the body of said shell adjacent but above the lower end of said shell, a vertical standpipe connected with said intake pipe and extending substantially centrally upwardly through the interior of said shell into the open upper shell end and spaced from the periphery of said upper end, means connecting said intake pipe outwardly of said body with a source of water supply, a discharge valve communicating with said standpipe at its upper end adjacent the top of said shell and spaced from said periphery, a filler of aggregate substantially completely filling said shell, said filler surrounding and supportingly engaging said standpipe to maintain said standpipe in substantially vertical position, said standpipe being supported vertically thereby and being otherwise without support throughout its length, a peripheral series of perforations formed in the body of said shell above the level of said intake pipe section, the lower portion of said shell below said series of perforations being imperforate and defining a sump for collection of overflow water to cool said intake pipe, said aggregate filler providing a filtration means along the length of said standpipe receiving said overflow water to cool said standpipe along its length.

3. External fountain means comprising a movable hollow upstanding shell having an open upper end, a horizontal intake pipe section rigidly connected to and extending outwardly through the body of said shell adjacent but above the lower end of said shell, a vertical standpipe connected with said intake pipe and extending centrally upwardly through the interior of said shell into the open upper shell end and spaced from the periphery of said upper end, means connecting said intake pipe outwardly of said body with a source of water supply, a discharge valve communicating with said standpipe at its upper end adjacent the top of said shell and spaced from said periphery, a filler of aggregate substantially completely filling said shell, said filler surrounding and supportingly engaging said standpipe to maintain said standpipe in substantially vertical position, said standpipe being supported vertically thereby and being otherwise without support throughout its length, a peripheral series of perforations formed in the body of said shell above the level of said intake pipe section, the lower portion of said shell below said series of perforations being imperforate and defining a sump for collection of overflow water to cool said intake pipe, said aggregate filler providing a filtration means along the length of said standpipe receiving said overflow water to cool said standpipe along its length.

4. External fountain means comprising a movable hollow upstanding shell having an open upper end, a horizontal intake pipe section rigidly connected to and extending outwardly through the body of said shell adjacent but above the lower end of said shell, a vertical standpipe connected with said intake pipe and extending centrally upwardly through the interior of said shell into the open upper shell end and spaced from the periphery of said upper end, means connecting said intake pipe outwardly of said body with a source of water supply, a discharge valve communicating with said standpipe at its upper end adjacent the top of said shell and spaced from said periphery, a filler of aggregate substantially completely filling said shell, said filler surrounding and supportingly engaging said standpipe to maintain said standpipe in substantially vertical position, said standpipe being supported vertically thereby and being otherwise without support throughout is length, a peripheral series of perforations formed in the body of said shell substantially at and slightly above the level of said intake pipe section, the lower portion of said shell below said series of perforations being imperforate and defining a sump for collection of overflow water to cool said intake pipe, said aggregate filler providing a filtration means along the length of said standpipe receiving said overflow water to cool said standpipe along its length.

References Cited in the file of this patent

UNITED STATES PATENTS

| | | |
|---|---|---|
| 746,125 | Murphy | Dec. 8, 1903 |
| 799,657 | Lambert | Sept. 19, 1905 |
| 1,156,190 | Sweet | Oct. 12, 1915 |
| 1,632,842 | Liening | June 21, 1927 |